(12) United States Patent
Winebrenner et al.

(10) Patent No.: US 8,060,655 B1
(45) Date of Patent: Nov. 15, 2011

(54) USER INTERFACE FOR CUSTOMER PREMISES COMMUNICATIONS GATEWAY

(75) Inventors: Robert R. Winebrenner, Olathe, KS (US); Kevin McGinnis, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 278 days.

(21) Appl. No.: 12/040,031

(22) Filed: Feb. 29, 2008

(51) Int. Cl.
*G06F 15/16* (2006.01)

(52) U.S. Cl. ...................................................... 709/249

(58) Field of Classification Search .................... 709/249
See application file for complete search history.

(56) References Cited

U.S. PATENT DOCUMENTS

| | | | |
|---|---|---|---|
| 5,950,128 A | 9/1999 | Ghisler | |
| 6,125,126 A | 9/2000 | Hallenst | |
| 6,169,904 B1 | 1/2001 | Ayala et al. | |
| 6,253,088 B1 | 6/2001 | Wenk et al. | |
| 6,407,779 B1* | 6/2002 | Herz | 348/734 |
| 6,847,706 B2* | 1/2005 | Bozorgui-Nesbat | 379/93.27 |
| 7,058,356 B2 | 6/2006 | Slotznick | |
| 7,257,644 B2 | 8/2007 | Simonnet et al. | |
| 7,383,308 B1 | 6/2008 | Groves et al. | |
| 7,636,931 B2 | 12/2009 | Gatto et al. | |
| 2001/0055951 A1 | 12/2001 | Slotznick | |
| 2004/0111269 A1 | 6/2004 | Koch | |
| 2004/0259537 A1* | 12/2004 | Ackley | 455/420 |
| 2005/0136832 A1 | 6/2005 | Spreizer | |
| 2005/0153699 A1 | 7/2005 | Kent et al. | |
| 2006/0126806 A1 | 6/2006 | Trandal et al. | |
| 2006/0142012 A1 | 6/2006 | Kirchhoff et al. | |
| 2006/0210050 A1 | 9/2006 | Bartfeld et al. | |
| 2007/0140299 A1 | 6/2007 | Hofmann et al. | |
| 2007/0206748 A1 | 9/2007 | Cassanova et al. | |
| 2009/0028312 A1 | 1/2009 | Karnalkar et al. | |
| 2009/0082010 A1* | 3/2009 | Lee et al. | 455/424 |
| 2009/0086947 A1 | 4/2009 | Vendrow | |
| 2009/0131086 A1 | 5/2009 | Osborn | |
| 2009/0214013 A1 | 8/2009 | Cassanova et al. | |

OTHER PUBLICATIONS

Non Final Office Action of U.S. Appl. No. 12/040,019, mailed Mar. 26, 2010.
Final Office Action of U.S. Appl. No. 12/040,019, mailed Sep. 15, 2010.
Non Final Office Action of U.S. Appl. No. 12/040,019, mailed Mar. 24, 2011.

* cited by examiner

*Primary Examiner* — Jeffrey Pwu
*Assistant Examiner* — Farhad Ali (57) ABSTRACT

A user interface is provided for an apparatus located at a customer premises location that manages routing of network services to communication endpoints at the customer premises location. The apparatus aggregates network traffic for the customer premises location and routes the network traffic to any of a variety of different communication endpoints at the customer premises location. Routing of network traffic may be based on user-configurable customer management rules. The user interface facilitates access to and interaction with network services and control of the customer management rules.

11 Claims, 5 Drawing Sheets

USER INTERFACE FOR CUSTOMER PREMISES COMMUNICATIONS GATEWAY

CROSS-REFERENCE TO RELATED APPLICATIONS

This application is related by subject matter to the invention disclosed in the commonly assigned application U.S. application Ser. No. 12/040,019, filed on even date herewith, entitled "CUSTOMER PREMISES EQUIPMENT COMMUNICATIONS GATEWAY."

SUMMARY

The present invention is defined by the claims below. This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention provide systems, methods, and computer-readable media for, among other things, providing a user interface for an apparatus that aggregates network traffic for a customer premises location, such as a home or business, and routes the network traffic to communication endpoints located at the customer premises location. Embodiments of the present invention have several practical applications in the technical arts including, but not limited to, accessing and interacting with network services and controlling network traffic routing to various communications endpoints at a customer premises locations based on user-configurable customer management rules.

Accordingly, in one aspect, an embodiment of the invention is directed to an apparatus located at a customer premises location. The apparatus includes a network interface for communicating with one or more networks providing a network service. The apparatus also includes a television interface for communicating content associated with the network service for presentation on a television communicatively coupled with the television interface. The apparatus further includes a femtocell for receiving input from a mobile device, wherein the input controls presentation of the content on the television.

In another aspect, an embodiment is directed to one or more computer-readable media comprising computer-useable instructions for performing a method. The method includes communicating content for presentation on a television via a television interface. The method also includes receiving input from a mobile device via a femtocell providing a wireless interface for communicating with the mobile device. The method further includes adjusting presentation of the content on the television based on the input from the mobile device received at the femtocell.

A further aspect is directed to an apparatus located at a customer premises location. The apparatus includes a network interface that communicates with one or more networks providing a number of network services to communication endpoints located at the customer premises location. The apparatus also includes a number of interfaces for providing the network services to the communication endpoints located at the customer premises location. The interfaces includes a television interface for communicating with a television and a femtocell for communicating with a mobile device at the customer premises location. The apparatus further includes data storage that includes customer management rules for routing the network services to the communication endpoints. The apparatus further includes a user interface allowing a user to configure the customer management rules. The user interface is configured to communicate data representing the customer management rules to the television interface for presentation on the television and to receive input from the mobile device via the femtocell for configuring the customer management rules.

BRIEF DESCRIPTION OF THE DRAWINGS

The present invention is described in detail below with reference to the attached drawing figures, which are incorporated by reference herein and wherein.

DETAILED DESCRIPTION

Traditionally, there are a number of unique, independent network services available to consumers at customer premises locations, such as a customers' homes or businesses. For instance, many consumers may receive landline telecommunications service (e.g., "home phone" service), mobile telecommunications service (e.g., "cell phone" service), television service, and/or Internet service. These network services may allow for, for example, voice calls, caller identification, messaging (e.g., short messaging service (SMS), instant messaging (IM)), voice mail, electronic mail, video-conferencing, push-to-talk, video-on-demand, and a wide variety of other capabilities.

Often, these network services are provided from separate networks owned and/or operated by different service providers. For example, a landline telecommunications network that provides landline telecommunications services may be owned and operated by a landline telecommunications-service provider. Additionally, a mobile telecommunications network that provides mobile telecommunications services may be owned and operated by a mobile telecommunications-service provider. A television-delivery network that provides television services may be owned and operated by a television-service provider. Further, Internet services may be provided by an Internet service provider.

Although customers may receive a variety of different network services, there is typically little to no convergence between those services. In particular, as noted above, the network services are often provided from different service providers maintaining independent networks for delivering their services. Although in some cases multiple network services may be offered by a single service provider and/or by multiple service providers acting in cooperation, the services still often remain separate and distinct with little or no convergence. Additionally, the various services require a variety of different customer premises equipment (CPE) for receiving the network services at a customer premises location. For instance, a customer may have a multimedia terminal adapter (MTA) for facilitating voice over IP (VoIP) telecommunications services, a femtocell for facilitating mobile telecommunications services, a media host device (e.g., a set-top box) for facilitating television services, and a modem for Internet access. Each of these pieces of CPE are generally independent and intended to facilitate a network service separate from the network service facilitated by the other devices.

In some instances, a limited amount of convergence is currently available between network services at the network layer. For example, a customer may be provided call forwarding to forward telephone calls for their landline telecommunication service (e.g., landline phone) to their mobile telecommunication service (e.g., to a cell phone). However, such convergence requires the network services to be managed at the network layer and communications associated with the network services to be routed through the various networks. A tremendous amount of network resources is required to provide such converged services. Additionally, converged services provided at the network layer are not very dynamic with respect to adding and provisioning new devices and services. Any changes to such converged services requires costly provisioning events and updates to network switches and other components.

Embodiments of the present invention permit, among other things, network services, including voice and data services, to be managed at a customer premises location, such as a home or business. In accordance with an embodiment of the present invention, an apparatus, referred to herein as a customer premises equipment (CPE) communications gateway, located at a customer premises location aggregates communication traffic for various network services available to the customer premises location. By aggregating the communication traffic at the CPE communications gateway, network services may be routed to various communication endpoints (e.g., landline phones, mobile devices, televisions, computers, etc.) located at the customer premises location.

In embodiments, a customer may establish customer management rules that are used by the CPE communications gateway to determine routing of network services to communication endpoints at the customer premises location. The customer management rules may determine routing of a given communication based on, for example, the type of network service associated with the communication, an intended communication endpoint for the communication, presence information available for communication endpoints, as well as other factors for determining routing.

Accordingly, embodiments of the present invention provide converged services without the need for extensive network deployments. In particular, embodiments allow, among other things, routing of network services to be performed by a CPE communications gateway located at a customer premises location instead of routing such services at the network layer. Additionally, a customer may manage the set of services associated with each communication endpoint and the routing of network traffic at the customer premises location based on customer management rules. As such, no changes at the network layer are required when the customer wishes to manage network services for the customer's communication endpoints.

Further embodiments allow a mobile device and television to be employed as a user interface for the CPE communications gateway. In particular, output from the CPE communications gateway may be communicated to the television via a television interface and presented by the television. Additionally, a user may employ a mobile device to provide input to the CPE communications gateway. The input may be provided from the mobile device to the CPE communications gateway using a femtocell.

Acronyms and Shorthand Notations

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| CMTS | Cable Modem Termination System |
| CPE | Customer Premises Equipment |
| DAVIC | Digital Audio Video Council |
| DOCSIS | Data Over Cable Service Interface Specification |
| HFC | Hybrid Fiber Coaxial |
| IM | Instant Messaging |
| IP | Internet Protocol |
| MTA | Multimedia Terminal Adapter |
| PSTN | Public-Switched Telephone Network |
| RF | Radio Frequency |
| SMS | Short Message Service |
| STB | Set-Top Box |
| VoIP | Voice over IP |

Further, various technical terms are used throughout this description. A definition of such terms can be found in *Newton's Telecom Dictionary* by H. Newton, 23rd Edition (2007). These definitions are intended to provide a clearer understanding of the ideas disclosed herein but are in no way intended to limit the scope of the present invention.

As one skilled in the art will appreciate, the present invention may be embodied as, among other things: a method, system, or computer-program product. Accordingly, the present invention may take the form of a hardware embodiment or an embodiment combining software and hardware. In an embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Figure 1:
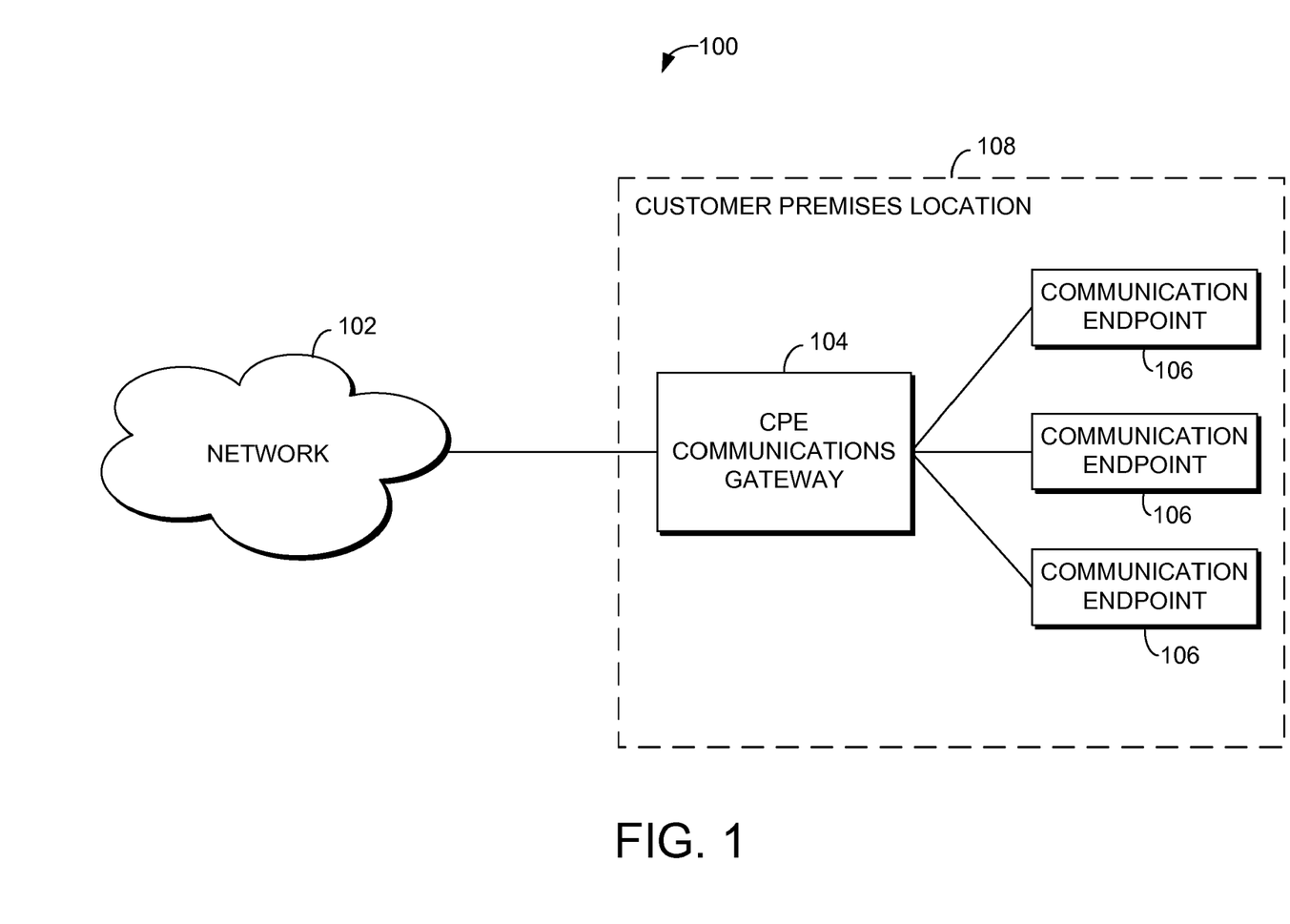
FIG. 1 is a block diagram of an exemplary system architecture suitable for use in implementing an embodiment of the present invention.

Referring to FIG. 1, a block diagram is shown of an exemplary system 100 in which exemplary embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

As shown in FIG. 1, the system 100 includes, among other components not shown, a customer premises equipment (CPE) communications gateway 104, having network access to a network 102 (which may be comprised of multiple, independent networks), and a number of communication endpoints 106 in communication with the CPE communications gateway 104. Generally, the CPE communications gateway 104 operates to aggregate communication traffic to and from the network 102 for a particular customer premises location 108, such as a home or a business. By aggregating the communication traffic for the network 102, various network services may be managed by the CPE communications gateway 104 at the customer premises location 108. In particular, the CPE communications gateway 104 may manage the network services by controlling communications traffic between the network 102 and the various communications endpoints 106. As will be described in further detail below, the CPE communications gateway 104 may implement customer management rules to determine routing of services to the various communication endpoints 106. By way of illustration only and not limitation, the network services may include voice and/or data services such as voice calls, caller identification, messaging (e.g., short messaging service (SMS), instant messaging (IM)), voice mail, electronic mail, video-conferencing, push-to-talk, and video-on-demand, to name a few.

The network 102 may include one or more wide area networks (WANs) and/or one or more local area networks (LANs), as well as one or more public networks, such as the Internet, and/or one or more private networks. For instance, the network 102 may include one or more networks providing network services, such as those discussed herein. Packets may be routed in and among the network 102 using protocols, such as the Internet Protocol (IP), and devices in communication within and among the network 102 may be identified by a network address, such as an IP address. Further, the network 102 may include a number of circuit-switched networks, such as the public-switched telephone network (PSTN), for example.

Figure 2:
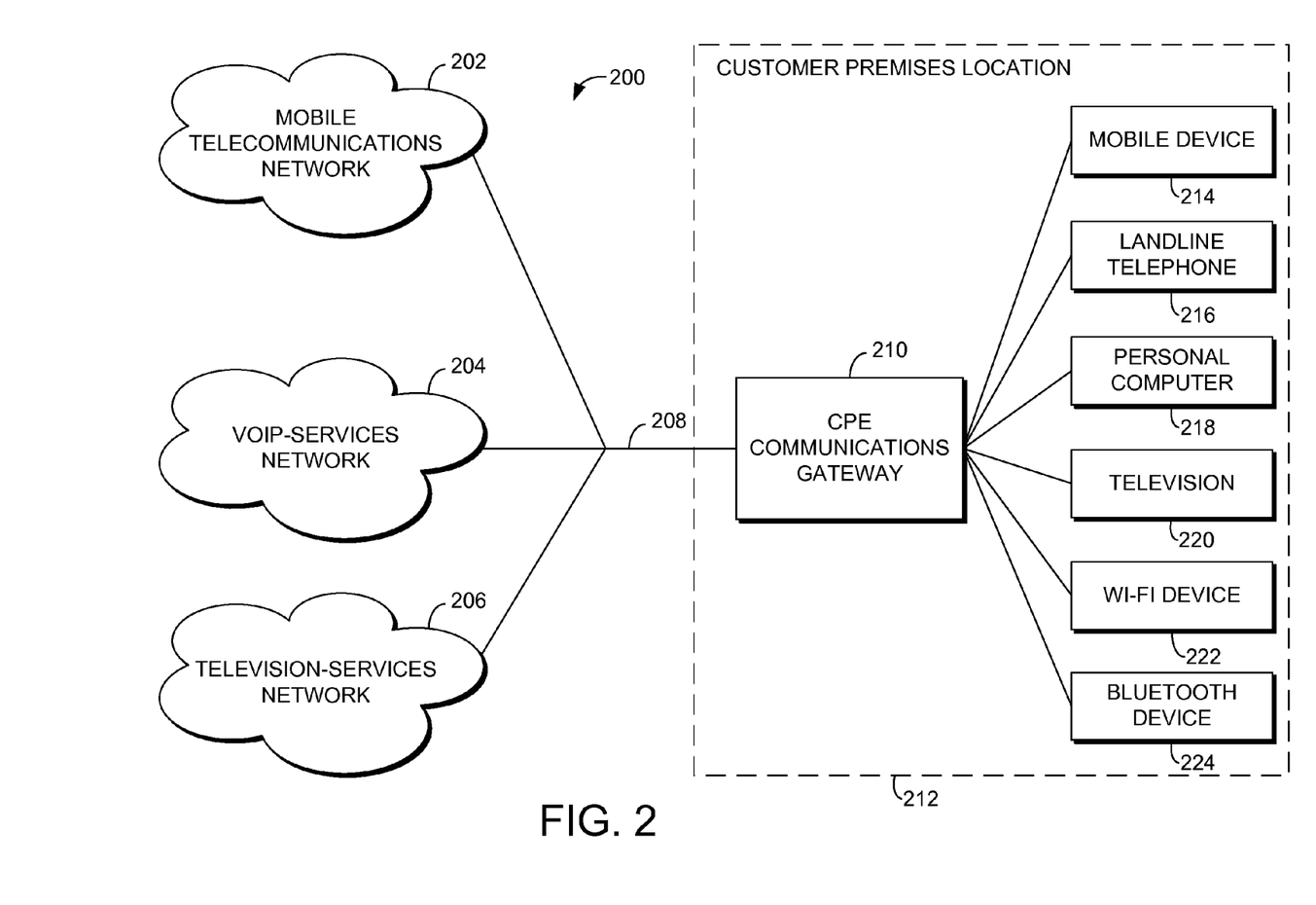
FIG. 2 is a block diagram of an exemplary communications system in accordance with an embodiment of the present invention.

FIG. 2 provides a block diagram illustrating a communications system 200 similar to the system 100 of FIG. 1, but includes examples of specific networks and communications endpoints that may be included within the system 200. It should be understood by one skilled in the art that the specific networks and communication endpoints shown in FIG. 2 are provided for illustration purposes only and do not limit embodiments of the invention. Other networks and/or communication endpoints may be included within the system 200 in various embodiments of the present invention. Additionally, networks and/or communication endpoints shown in FIG. 2 may be omitted from the system 200 in various embodiments. Any and all such variations are contemplated to be within the scope of embodiments of the present invention.

Similar to the system 100 of FIG. 1, the system 200 illustrates an embodiment in which a CPE communications gateway 210 manages network services from a variety of networks and for a variety of communication endpoints. The networks include a mobile-telecommunications network 202, a voice over IP (VoIP)-services network 204, and a television-services network 206. In various embodiments of the present invention, the networks may be combined or divided into separate networks. Additionally, one or more of the networks may be communicatively coupled via one or more gateways.

As shown in FIG. 2, the CPE communications gateway 210 is communicatively coupled to the networks via a broadband connection 208. A variety of different types of broadband connections may be employed within various embodiments of the present invention. By way of example only and not limitation, in an embodiment, the broadband connection 210 may comprise a cable broadband connection provided, for instance, by a cable-television service provider. In such an embodiment, the broadband connection 208 may include a headend/cable modem termination system (CMTS) and a hybrid fiber coaxial network between the headend/CMTS and customer premises locations. Additionally, communications may comply with specifications, such as "DAVIC" (Digital Audio Video Council) specifications or "DOCSIS" (Data Over Cable Service Interface Specification) specifications. In other embodiments, the broadband connection 208 may comprise a satellite broadband connection or a DSL (digital subscriber line) broadband connection.

Communication endpoints at the customer premises location 212 include a mobile device 214, a landline telephone 216, a personal computer (PC) 218, a television 220, a Wi-Fi device 222, and a Bluetooth device 224. Although only one of each type of communication endpoint is shown in FIG. 2, it should be understood that the customer premises location 212 may include more than one of each type of communication endpoint, and the CPE communications gateway 210 may manage traffic for each of the communication endpoints. In general, the mobile device 214 may be any type of device, such as a cell phone, a pager, or a personal data assistance (PDA), capable of communicating wirelessly via a radio access network (RAN) in a licensed spectrum using a format, such as CDMA, TDMA, GSM, 3G, or other acceptable format. The landline telephone 216 may be a traditional analog telephone. The person computer (PC) 218 may be any type of personal computing device, such as a laptop or desktop computer, for instance. The television 220 may be any type of analog and/or digital television capable of presenting multimedia and other content. The Wi-Fi device 222 may be any type of device capable of communicating wirelessly based on the IEEE 802.11 standards. The Bluetooth device 224 may be any type of device capable of communicating wirelessly based on the Bluetooth specifications.

Figure 3:
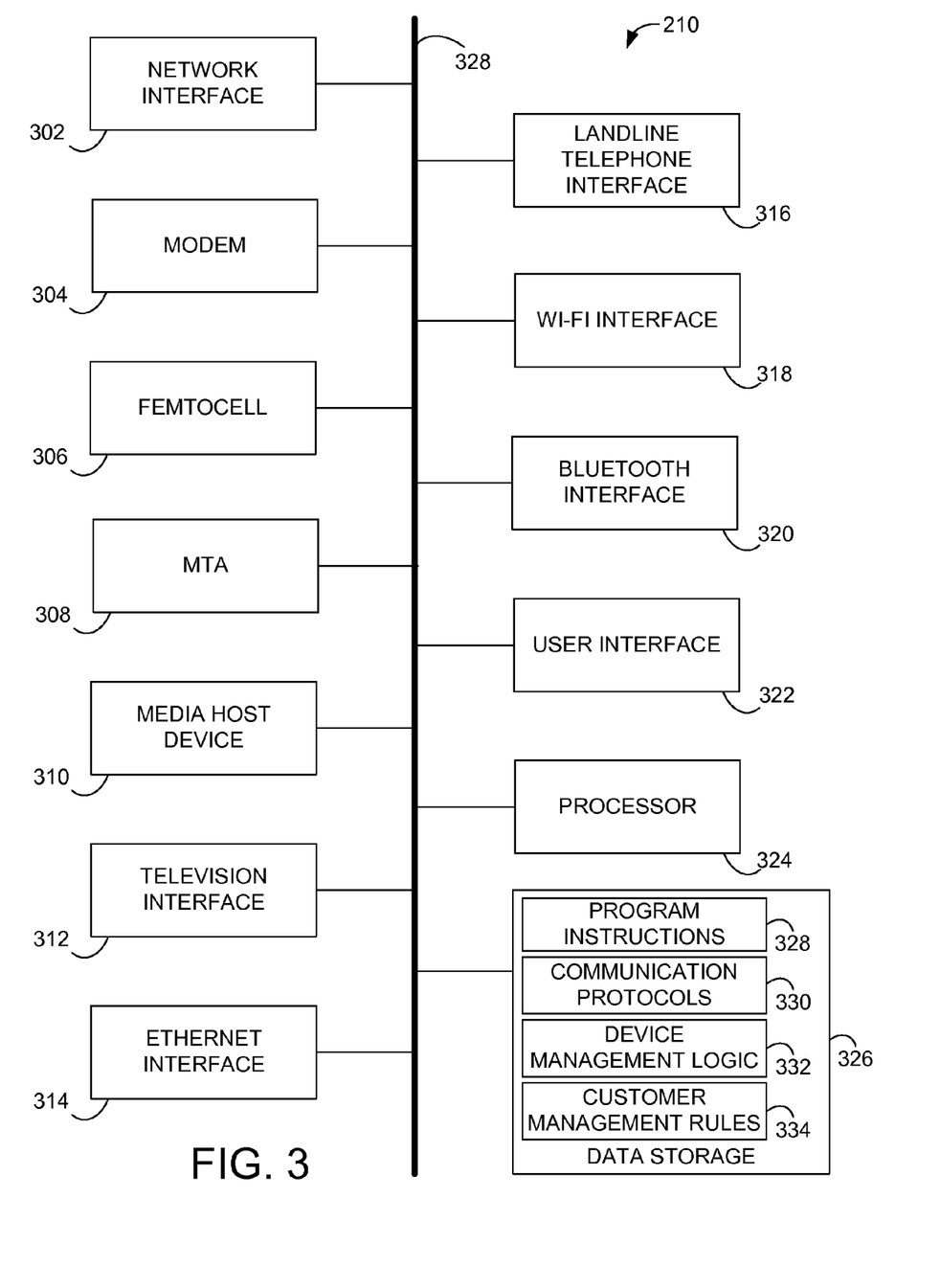
FIG. 3 is a block diagram of an exemplary customer premises equipment communications gateway in accordance with an embodiment of the present invention.

As indicated previously, the CPE communications gateway 210 is capable of managing network services from the various networks for the communication endpoints at the customer premises location 212. An embodiment of the CPE communications gateway 210 is illustrated in further detail in FIG. 3. As shown in FIG. 3, the CPE communications gateway 210 includes, a network interface 302, a modem 304, a femtocell 306, a multimedia terminal adapter (MTA) 308, a media host device 310, a television interface 312, Ethernet interface 314, a landline telephone interface 316, a Wi-Fi interface 318, a Bluetooth interface 320, a user interface 322, a processor 324, and a data storage 326, some or all of which may be communicatively linked, for instance, using a system bus 328. It should be understood that the components of the CPE communications gateway 210 are provided by way of illustration only. In various embodiments of the present invention, a CPE communications gateway may exclude components shown in FIG. 3 and may include components not shown in FIG. 3. Additionally, although the components are described herein as being within a single device, it should be understood that one or more of the components shown in FIG. 3 may be distributed among a plurality of devices. Any and all such variations are contemplated to be within the scope of embodiments of the present invention.

The network interface 302 provides the CPE communications gateway 210 with network connectivity to one or more networks (e.g., the mobile telecommunications network 202, the VoIP-services network 204, and the television-services network 206) via the broadband connection 208. A modem 304 (e.g., a cable modem, a DSL modem, etc.) is communicatively coupled with the network interface 302 to provide network access by modulating and demodulating signals to and from the broadband network connection.

The femtocell 306 is a small or low-power base station (i.e., an "access point based station") designed for use in the customer premises location 212 to provide wireless service to mobile devices, such as the mobile device 214. Additionally, the femtocell 306 may communicate with the mobile telecommunications network 202 via the broadband connection 208. The femtocell 306 is compliant with RAN technologies, and communications between the femtocell 306 and a mobile device may occur in a licensed spectrum using a format, such as CDMA, TDMA, GSM, 3G, or other acceptable format.

The MTA 308 may generally provide codecs and signaling functions required for providing VoIP functionality between a customer-side interface to communications endpoints, such as the landline telephone 216, and a network-side interface, such as the network interface 302, for communicating with network components such as within the VoIP-services network 204.

The media host device 310 may be capable of receiving analog and/or digital television and other content from the television-services network 206 and preparing the content for output, such as output on the television 220. For instance, the media host device 310 may include a tuner for tuning to a particular television channel. Additionally, the media host device 310 may be capable of communicating data with the television-services network 206. The media host device 310 may be commonly referred to as a "set-top box" (STB).

The CPE communications gateway 210 may also include a number of interfaces for communicating with communication endpoints at the customer premises location 212. The television interface 312 may include a port configured to transmit and receive signals to and from a television, such as the television 220, via coaxial cable or other mechanisms. The Ethernet interface 314 may include an Ethernet connector (e.g., an RJ45 jack) for coupling to devices, such as the PC 218, using Ethernet cabling. The landline telephone interface 316 may include a conventional telephone jack (e.g., an RJ11, RJ14, RJ25 jack) for connecting to a standard landline telephone, such as the landline telephone 216. The CPE communications gateway 210 also includes short-range RF wireless interfaces. For instance, the Wi-Fi interface 318 may provide wireless transmission and reception capabilities for communicating with communication endpoints based on the IEEE 802.11 standards. Additionally, the Bluetooth interface 320 may similarly provide wireless transmission and reception capabilities for communicating with communication endpoints based on the Bluetooth specifications. It should be understood by one skilled in the art that the interfaces for communicating with communication endpoints shown in FIG. 3 are provided for illustrative purposes only. In various embodiments of the present invention, interfaces shown in FIG. 3 may be excluded from a CPE communication gateway while other interfaces not shown in FIG. 3 may be included.

The user interface 322 may include mechanisms to provide outputs to and receive inputs from users. For providing outputs, the user interface 322 may include a display (e.g., an LCD) for presenting text-based and/or graphics-based messages, menus, prompts, time of day, channel number, etc. The user interface 322 may also include a speaker for playing audio recordings and prompts. In some embodiments, the user interface 322 may provide signals to the television interface 312 for output via a connected television, such as the television 222. In general, the user interface 322 may include any mechanisms now known or later developed for conveying information to users.

For receiving inputs (e.g., commands) from users, the user interface 322 may include one or more input mechanisms, such as a remote control communicating with the CPE communications gateway 210 via infrared signaling, as well as buttons, a touch sensitive display, and/or a microphone, etc. As will be described in further detail below, in some embodiments, a mobile device, such as the mobile device 214, may be used as an input device by communicating signals to the femtocell 306. Any number of other input mechanisms may also be part of the user interface 322. In general, the user interface 322 may include any mechanisms now known or later developed for receiving inputs from users.

Data storage 326 may store program instructions 328, communication protocols 330, device management logic 332, and customer management rules 334. Data storage 326 may take various forms, in one or more parts, such as a non-volatile storage block and/or a removable storage medium. Program instructions 328 may comprise machine language instructions executable by processor 324 to carry out various functions described herein. Communication protocols 330 may be necessary to receive and send data from various networks and devices communicatively coupled with the CPE communications gateway 214. Communication protocols 330 may include SIP, HTTP, DOCSIS, TCP, UDP, IP, SMTP, DHCP, DNS, IMCP, PPP, SMPP, as well as one or more proprietary protocols, etc. Data storage 326 may also store device management logic 332, which may manage other aspects of the CPE communications gateway 210, such as memory and file management. The processor 324 may control many operations of the CPE communications gateway 210 by executing instructions 328, and may comprise multiple (e.g., parallel) processors, such as a general purpose microprocessor and/or a discrete digital signal processor.

The customer management rules 334 are used by the CPE communications gateway 210 to determining routing of network traffic between the various networks and the communication endpoints located at the customer premises location 212. The customer management rules 334 may be user-configurable allowing users to manage network traffic at the customer premises location. Generally, the rules 334 may be used to determine routing of network communications to communication endpoints based on any of a variety of different factors including, among other things, the type of network service for a given communication, the intended communication endpoint, and/or presence information for the communication endpoints. Accordingly, a network communication received at the CPE communications gateway 210 may be provided to an originally intended communication endpoint and/or to other communication endpoints based on the customer management rules.

As noted above, in some embodiments, the customer management rules 334 may determine routing of network communications to communication endpoints at the customer premises location based on the type of network service for a given communication and/or the intended communication endpoint. For example, a customer management rule may be established to determine routing for a voice call received from the mobile telecommunications network 202, and intended for a mobile device, such as the mobile device 214. In some cases, a customer management rule may simply route the network communication to the intended communication endpoint. For instance, the voice call may simply be routed to the mobile device 214 using the femtocell 306. In other cases, a customer management rule may route the network communication to one or more other communication endpoints without routing the communication to the intended communication endpoint. For instance, the voice call may be routed to the landline telephone 216 (using the landline telephone interface 316) and/or the Bluetooth device 224 (using the Bluetooth interface 320) without routing the voice call to the mobile device 214. In further cases, the customer management rule may be configured to route the network communication to both the intended communication endpoint and one or more other communication endpoints. For instance, the voice call may be routed to both the mobile device 214 and the landline telephone 216. In some embodiments, multiple communication endpoints may be used in conjunction to receive a network service via the CPE communications gateway. For instance, the television 220 and mobile device 214 may be used for a SMS session. In particular, text messages may be displayed on the television 220, while the user employs the mobile device 214 to input text during the SMS session. In sum, a network communication received at the CPE communications gateway 210 may be provided to the intended communication endpoint and/or one or more other communication endpoints based on the customer management rules 334. Any and all such variations are contemplated to be within the scope of embodiments of the present invention.

In some cases, multiple network communications may be received together at the CPE communications gateway 210. For instance, when a voice call is received, call identification information may also be received for that call. By defining the customer management rules 334 by the type of network service for a network communication, the related communications may be treated differently. For example, when a voice call and caller identification information is received at the CPE communications gateway 210 for a given incoming call, the customer management rules 334 may route the voice call to the landline phone 216 and route the call identification information to the television 220.

In some embodiments, the customer management rules 334 may route network communications based on presence information available for one or more of the communication endpoints at the customer premises location. Generally, presence information may be any type of data describing the availability or state of a communication endpoint, such as, for example, whether a communication endpoint is online, offline, busy, idle, or currently engaged in a type of communication session. For instance, presence information may be determined for the mobile device 214 based on the mobile device 214 being located at the customer premises location 228 as detected by the femtocell 306. Using this presence information, the customer management rules may indicate that telephone calls intended for the landline phone 216 should be routed to the mobile device 214 when the mobile device's 214 presence is detected at the customer premises location 212 and should be routed to the landline phone 216 when the mobile device's 214 presence is not detected at the customer premises location 212.

As another example, presence information for the television 220 may include the content currently being presented via the television 220 (e.g., as determined by the media host device 310). For instance, a user may not wish to be disturbed by caller identification information being presented on the television 220 while watching a particular show. The user may establish customer management rules 334 that indicate that caller identification information should normally be presented on the television 220 but the caller identification information should not be presented on the television 220 when a given show is being watched. In some cases, more complex customer management rules may be established by a user to determine routing. For instance, in the previous example of caller information not being provided to the television 220 when a particular show is being watched, the user may further define the customer management rules 334 to indicate that caller identification information may be presented on the television 220 when that show is being watched if the call is from a particular caller. In general, one skilled in the art will recognize that a wide variety of presence information may be determined for the various communication endpoints at the customer premises location 212 and used by customer management rules to determine routing of network services.

Figure 4:
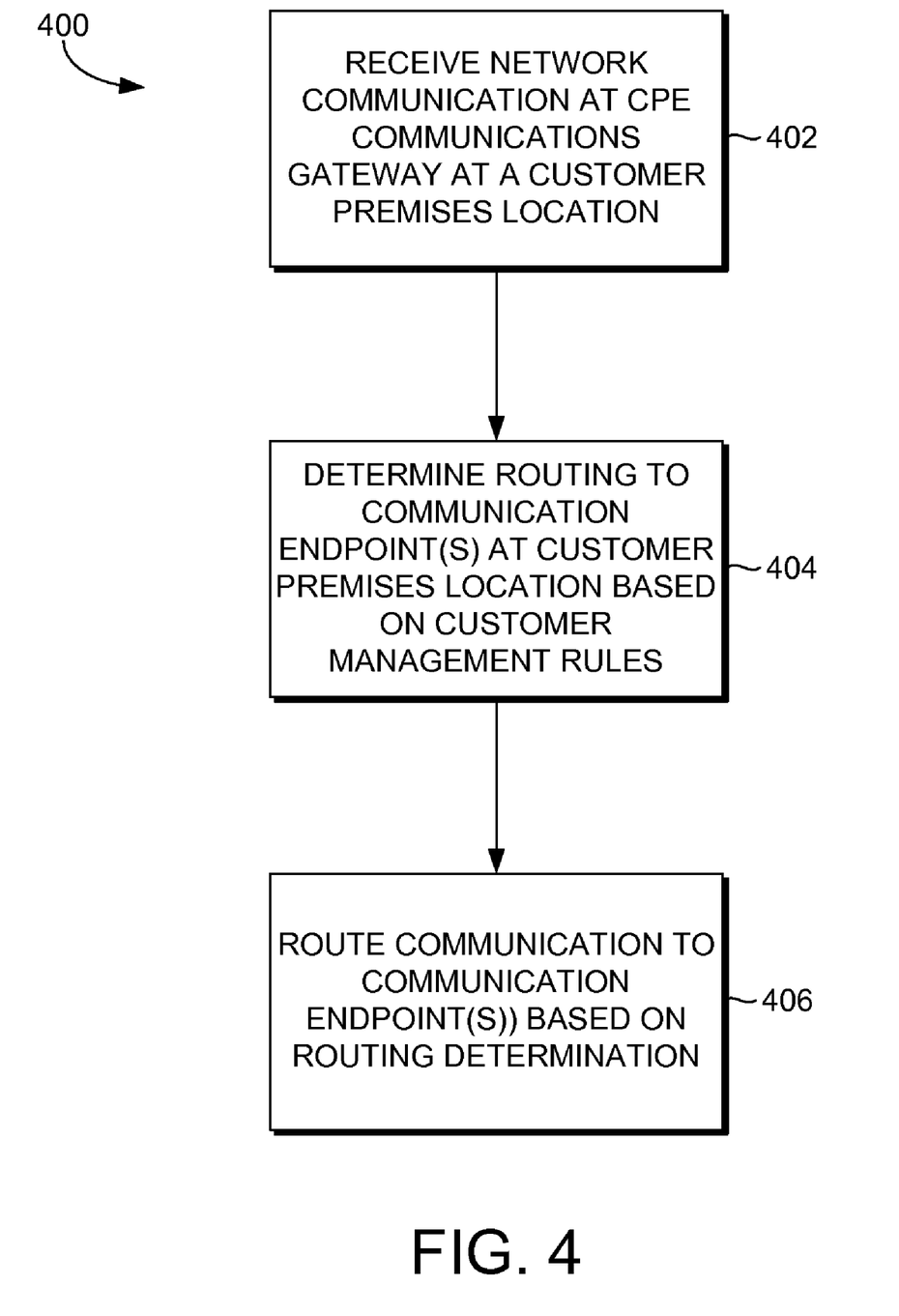
FIG. 4 is a flow diagram showing a method for managing network services at a customer premises location using a customer premises equipment communications gateway in accordance with an embodiment of the present invention.

Turning now to FIG. 4, a flow diagram is provided illustrating a method 400 for managing network services at a CPE communications gateway in accordance with an embodiment of the present invention. As shown at block 402, a communication is received at the CPE communications gateway located at a customer premises location, such as a home or business. As discussed previously, the CPE communications gateway is configured to receive network traffic for a variety of different network services and to manage routing of network traffic to various communication endpoints at the customer premises location.

The communication received at block 402 is for a particular type of network service and may be communicated from a given network. Additionally, the communication is intended to be received by a first communication endpoint at the customer premises location. For instance, the communication may be a voice call from a mobile telecommunications network intended to be received by a particular mobile device, such as a cell phone, via a femtocell located at the customer premises location. As another example, the communication may be a voice call from a VoIP telecommunications network intended to be received by a landline telephone via an MTA located at the customer premises location. As discussed previously, the communication may generally be any of a variety of different types of network services such as, for instance, a voice call, caller identification, messaging (e.g., short messaging service (SMS), instant messaging (IM)), voice mail, electronic mail, video-conferencing, push-to-talk, and video-on-demand.

As shown at block 404, the CPE communications gateway determines routing for the communication to one or more communication endpoints within the customer premises location. The routing determination is made based on one or more customer management rules that may be maintained by the CPE communications gateway. The customer management rules may determine routing based on a variety of factors, including, for instance, the type of network service for the communication, the intended communication endpoint for the communication, and/or presence information available for communication endpoints at the customer premises location.

Based on the routing determination made at block 404, the communication is routed from the communications gateway to one or more communication endpoints at the customer premises location, as shown at block 406. In some instances, the communication may be routed to the intended communication endpoint. In other instances, the communication may be routed to one or more other communication endpoints, while not also being routed to the intended communication endpoint. In further instances, the communication may be routed to both the intended communication endpoint and one or more other communication endpoints.

As indicated previously, in some embodiments of the present invention, a mobile device may be employed as an input device for a CPE communications gateway for a variety of different purposes. Additionally, in some cases, a mobile device and television may be used together as a user interface for the CPE communications gateway. In such embodiments, the mobile device is employed as a input device and the television serves as an output device. In particular, input from the mobile device is received at the CPE communications gateway by the femtocell, and output is communicated to the television via the television interface.

By way of example only and not limitation, the mobile device/television user interface may be employed by a user to manage the customer management rules for the CPE communications gateway. In particular, customer management rules may be presented on the television, and the user may employ the mobile device to provide input to update the customer management rules. In other embodiments, the mobile device/television user interface may be employed to interact with network services aggregated by the CPE communications gateway. For instance, the mobile device/television user interface may be used to operate a media host device accessing television services by, for example, changing the channel tuned by the media host device, accessing a television guide, or ordering a video-on-demand. As another example, the mobile device/television user interface may be employed by a user to access messaging services, such as SMS and IM. Text messages may be displayed on the television, while the user employs the mobile device to enter text.

Figure 5:
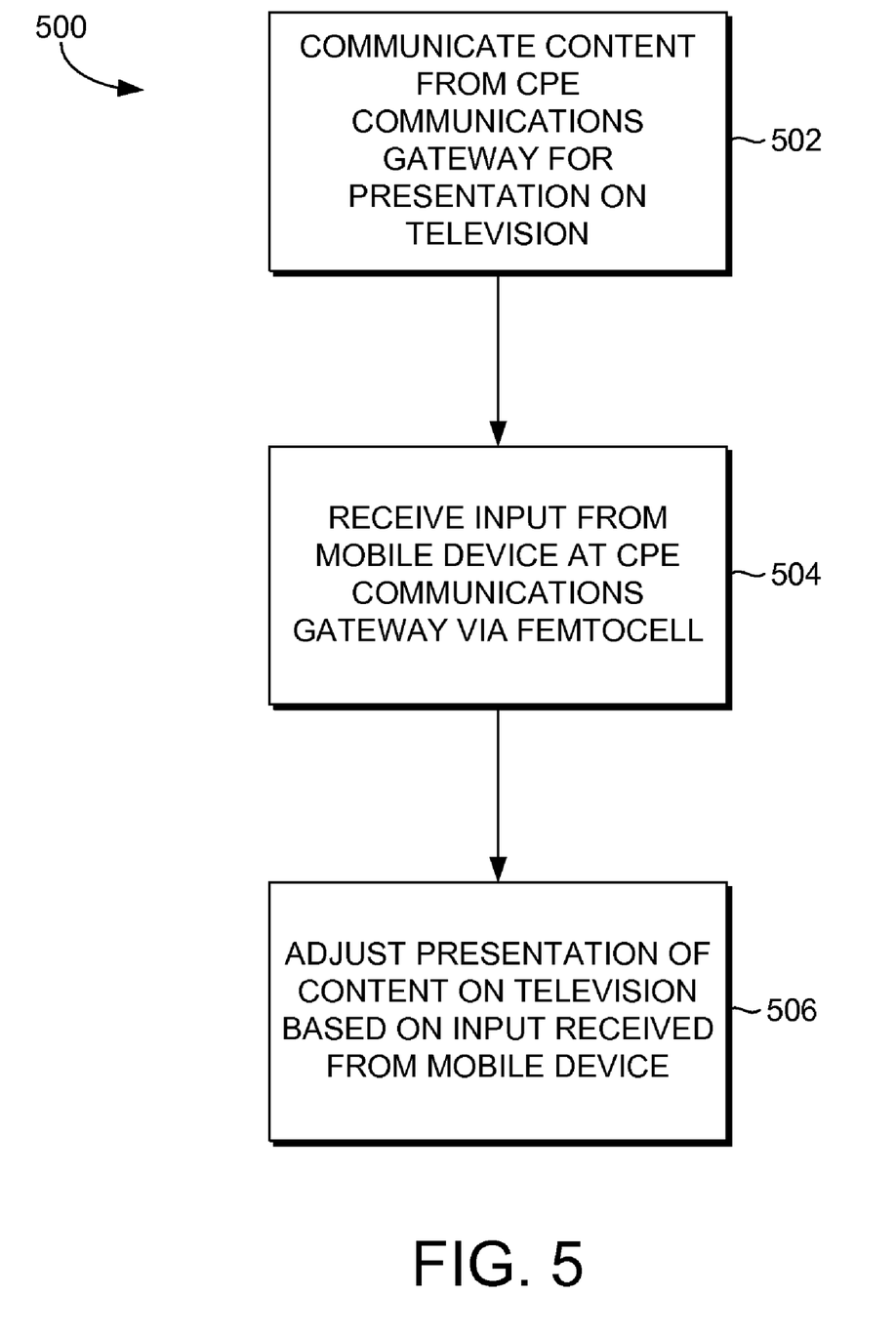
FIG. 5 is a flow diagram showing a method for employing a television and a mobile device as a user interface for a customer premises equipment communications gateway in accordance with an embodiment of the present invention.

Turning now to FIG. 5, a flow diagram is provided illustrating a method 500 for using a mobile device and a television as a user interface for a CPE communications gateway in accordance with an embodiment of the present invention. As shown at block 502, content is communicated for presentation on the television. In particular, the content is communicated to the television via the television interface of the CPE communications gateway. The content may include audio content (e.g., presented via speakers on the television) and/or visual content (e.g., displayed by the television). In embodiments, the content may be associated with a network service, such as a service from a television-services network or a mobile telecommunications network, for instance. In some embodiments, the content may be associated with the customer management rules, thereby allowing the user to view currently set customer management rules for routing the network services at the customer premises location.

A user may review the content presented via the television and decide to provide input using a mobile device. For instance, in the case the user is viewing the customer management rules, the user may wish to update the rules. As shown at block 504, an input is received at the CPE communications gateway from the mobile device. In particular, the user may employ a keypad or entry component on the mobile device to provide input, causing the mobile device to communicate the input to the CPE communications gateway via the femtocell. The input may include a variety of different inputs, such as alphanumeric inputs and cursor movements, for instance. In some cases, a mobile device may have a qwerty keyboard to provide text input. However, in some cases, a mobile device, such as a cell phone, may include a numerical keypad. Accordingly, to enter text input, the user may employ triple-tap text entry using the numerical keypad.

Based on the input from the mobile device received at the CPE communications gateway by the femtocell, the presentation of the content on the television is adjusted, as shown at block 506. For instances, the selections made or text provided by the user using the mobile device may be reflected on the television.

In some embodiments, based on the input from the mobile device, a communication may be sent from the CPE communications gateway to a network. For instance, in the event that a user is employing the mobile device and television as a user interface for accessing messaging services, when the user enters text using the mobile device, the text message may be communicated to a network facilitating the messaging services. As another example, when the user is employing the mobile device and television as a user interface for television services, such as to order a video-on-demand, the user may select a particular video from a selection menu, for instance, causing a communication to be sent from the CPE communications gateway to a television-services network to order the selected video.

As can be seen, embodiments of the present invention allow network services for a customer premises location to be aggregated and routed to various communications endpoints using a CPE communications gateway. Additionally, embodiments allow a mobile device to be used as an input device for the CPE communications gateway. Many different arrangements of the various components depicted, as well as components not shown, are possible without departing from the spirit and scope of the present invention.

The present invention has been described in relation to particular embodiments, which are intended in all respects to be illustrative rather than restrictive. Alternative embodiments will become apparent to those skilled in the art that do not depart from its scope. Many alternative embodiments exist but are not included because of the nature of this invention. A skilled programmer may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. An apparatus that, when positioned at a customer premises location, facilitates routing of network services, the apparatus comprising:
   a network interface that receives television content from a television-services network and that receives voice calls from a voice over IP services network;

a television interface that provides the television content to a television communicatively coupled with the television interface; and a femtocell that provides the voice calls to a mobile device and that receives input from the mobile device, wherein the input prescribes whether the television content is to be routed to the television and wherein the network interface, the television interface, and the femtocell are all housed in the apparatus as an integrated unit.

2. The apparatus of claim 1, wherein the apparatus includes a media host device for facilitating receiving television services.

3. The apparatus of claim 2, wherein the television services include a television programming service, a television-guide service, a video-on-demand service, or a combination thereof.

4. The apparatus of claim 1, wherein the femtocell is in communication with a wireless telecommunications network, and wherein the network service comprises a wireless telecommunications service.

5. The apparatus of claim 4, wherein the wireless telecommunications service comprises at least one of: a short message service, an instant message service, a picture mail service, an electronic mail service, and a voice message service.

6. The apparatus of claim 1, wherein the content communicated for presentation on the television comprises at least one of audio content and visual content.

7. The apparatus of claim 1, wherein the input received from the mobile device comprises text input.

8. The apparatus of claim 7, wherein the mobile device includes a numeric keypad, and wherein the text input comprises triple-tap text entry from the numeric keypad.

9. The apparatus of claim 1, wherein the mobile device comprises at least one of a cell phone, a pager, and a personal data assistant.

10. The apparatus of claim 1, wherein based on the input from the mobile device, a communication is sent to the one or more networks via the network interface.

11. An apparatus that, when positioned at a customer premises location, facilitates routing of network services, the apparatus comprising:

a network interface that communicates with one or more networks providing a plurality of network services to communication endpoints located at the customer premises location;

a plurality of interfaces, each of which transfers network services to a respective communication endpoint, wherein the plurality of interfaces includes a television interface for communicating with a television and a femtocell for communicating with a mobile device at the customer premises location;

data storage including a plurality of customer management rules that prescribe a respective endpoint to which each network service of the plurality of network services is to be routed; and a user interface that receives user-provided instructions configuring the customer management rules,
  (1) wherein the user interface communicates data representing the customer management rules to the television interface, thereby enabling presentation of the customer management rules on the television,
  (2) wherein the user interface receives user-provided instructions from the mobile device via the femtocell, and
  (3) wherein the network interface, the television interface, the femtocell, the data storage, and the user interface are all housed in the apparatus as an integrated unit.

* * * * *